May 10, 1938. R. F. TELLKAMP 2,116,915
MOTOR VEHICLE SAFETY MEANS
Filed Oct. 26, 1936
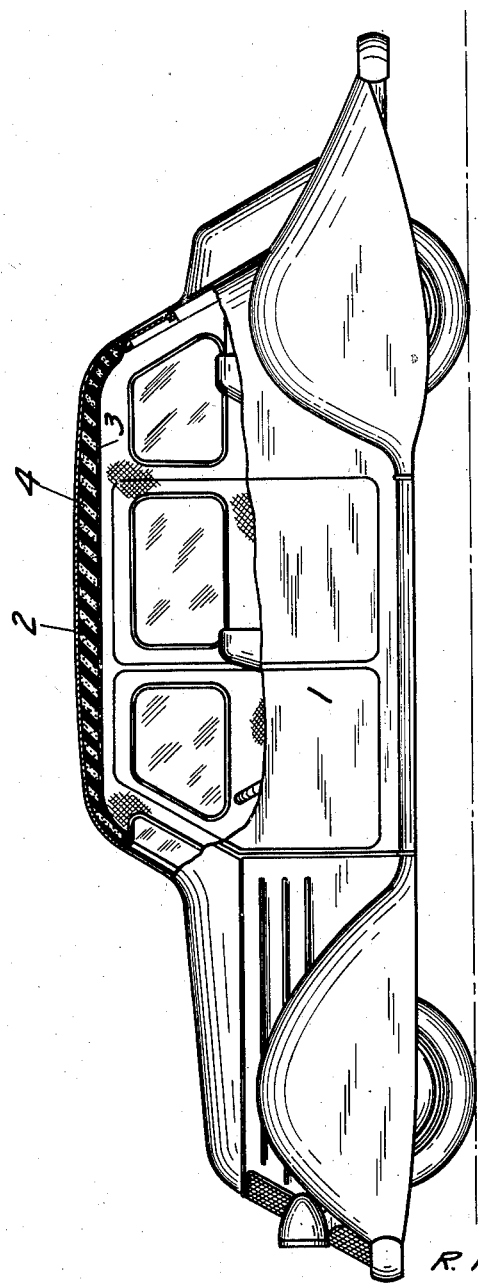
R. F. TELLKAMP INVENTOR.
BY
Merrill M. Blackburn
ATTORNEY Patented May 10, 1938

2,116,915

UNITED STATES PATENT OFFICE 2,116,915

MOTOR VEHICLE SAFETY MEANS

Roland F. Tellkamp, Davenport, Iowa

Application October 26, 1936, Serial No. 107,665

1 Claim. (Cl. 296—137)

The present invention relates to means for preventing or lessening injuries by reason of contact between the occupant of a vehicle and the part of the structure above the head. Among the objects of this invention are to provide in a motor vehicle a simple means for reducing shocks caused by contact of the person, particularly the head of an occupant of the vehicle, with the adjacent portion of the vehicle, especially the overhead framing thereof; to provide a soft yieldable cushioning means, within the upper part of the vehicle, which will not detract from the appearance of the interior of the vehicle; and such further objects, advantages, and capabilities as will hereafter appear and as are inherent in the construction disclosed herein.

In the drawing, the single figure represents a motor vehicle of the land type with a portion of the upper part broken away and in section, to show the embodiment of my invention therein.

In this specification and the appended claim, the expression, "motor vehicle", is used to indicate any self-propelled vehicle, whether for use on land or in the air. The vehicle is denoted, in general, by the numeral 1, its deck by the numeral 2, the fabric lining by the numeral 3, and the cushioning means by the numeral 4. This cushioning means should be light and soft but still of a texture to offer ample resistance so that, if the vehicle is turned over, the physical person of the occupant will not be injured by coming in contact with the deck or its framing.

While various substances may be used in this cushioning means, I prefer to use something of the general nature of sponge rubber which will furnish plenty of cushioning or padding for the deck and its framing but will still have body enough to prevent serious injury to a person coming in contact therewith. It will be understood that the same idea can be applied to cabin planes, just as well as to automobiles, buses, and trucks. Also, this idea may be used in connection with other inner surfaces of the vehicle than the deck but not with the same facility.

Another purpose of this porous padding is to serve as insulating means, particularly for reducing the transmission of heat due to the sun shining on the deck during the heat of the day.

It will of course be understood that the specific description of structure set forth herein may be departed from without departing from the spirit of this invention as set forth in this specification and the appended claim.

Having now described my invention, I claim:

In an automobile having a sheet metal deck, a heat, shock, and sound insulating pad of porous, yielding material having a tendency to resist distortion, said pad being formed from a single piece and having substantially its entire upper surface secured directly to the inside surface of said deck, said pad extending from end to end and from side to side of the vehicle and protecting the occupants of the vehicle from violent contact with any part of the interior of the deck.

ROLAND F. TELLKAMP.